(12) United States Patent
Vuorenmaa et al.

(10) Patent No.: US 6,387,420 B1
(45) Date of Patent: May 14, 2002

(54) PROCEDURE FOR PREPARING A FOOD ADDITIVE, AND AN ADDITIVE AND ITS USE

(76) Inventors: Juhani Vuorenmaa, Listakatu 11 A 6, FIN-33400 Tampere; Markku Virkki, Laurinlahdenkuja 1 C 6, FIN-02320 Espoo; Elias Jukola, Katajapolku 4 C, FIN-00780 Helsinki; Marko Lauraeus, Siltasaarenkarki 3 C 24; Hanna Jatila, Sornaisten Rantatie 10 B 72, both of FIN-00530 Helsinki; Juha Apajalahti, Kytöniityntie 24 C, FIN-00670 Helsinki; Paivi Nurminen, Hulluksentie 1 A 8, Fin-20430 Masala, all of (FI)

( * ) Notice: Subject to any disclaimer, the term of this patent is extended or adjusted under 35 U.S.C. 154(b) by 0 days.

(21) Appl. No.: 09/862,389

(22) Filed: May 21, 2001

Related U.S. Application Data

(63) Continuation-in-part of application No. 08/331,708, filed as application No. PCT/FI97/00831 on Dec. 22, 1997, now abandoned.

(30) Foreign Application Priority Data

Dec. 23, 1996 (FI) .................................................. 965192

(51) Int. Cl.[7] .............................. A23K 1/00; A23L 1/09

(52) U.S. Cl. ............................. 426/62; 426/807; 426/2

(58) Field of Search ............................ 426/62, 807, 2

(56) References Cited

U.S. PATENT DOCUMENTS

| | | | | | |
|---|---|---|---|---|---|
| 3,443,969 | A | * | 5/1969 | Nakajima et al. | 99/140 |
| 3,833,552 | A | | 9/1974 | Akin | 260/112 |
| 3,855,063 | A | * | 12/1974 | Nagasawa et al. | 95/28 |
| 3,914,450 | A | * | 10/1975 | Robbins et al. | 426/533 |
| 5,288,509 | A | * | 2/1994 | Potman et al. | 426/60 |
| 5,486,368 | A | * | 1/1996 | de Boer et al. | 426/41 |

FOREIGN PATENT DOCUMENTS

| | | | |
|---|---|---|---|
| CA | 1082977 | * | 8/1980 |
| CS | 137446 | * | 7/1970 |
| EP | 0133547 | * | 2/1985 |
| EP | 0229078 | * | 7/1987 |
| EP | 0286056 | * | 10/1988 |
| EP | 0549478 | * | 6/1993 |
| FI | 44979 | * | 11/1971 |
| GB | 1032687 | * | 6/1966 |
| GB | 1519164 | * | 7/1978 |
| GB | 2011910 | * | 7/1979 |
| GB | 1569300 | * | 6/1980 |
| GB | 2167639 | * | 6/1986 |
| RU | 20 07928 | | 2/1994 |
| WO | 9638057 | * | 12/1996 |

* cited by examiner

Primary Examiner—Chhaya D. Sayala
(74) Attorney, Agent, or Firm—Abelman, Frayne & Schwab

(57) ABSTRACT

The invention relates to a procedure for preparing a feed additive, in which a brewing yeast raw material containing oligosaccharides and/or polysaccharides is filtered and treated hydrolytically so that the cell wall structure is opened.

20 Claims, No Drawings

PROCEDURE FOR PREPARING A FOOD ADDITIVE, AND AN ADDITIVE AND ITS USE

This is a continuation-in-part of application U.S. Ser. No. 08/331,708, filed Aug. 18, 1999, now abandoned, which is a 371 of PCT/FI97/00831 filed Dec. 22, 1997.

The present invention relates to a procedure for preparing a food additive as defined in the preamble of claim 1. Moreover, the invention relates to a food additive, its use and a preparation containing the additive.

A balance of intestinal microbes is a condition for the health and well-being of animals and for their productivity. Disturbances of this balance appear as diarrhoea and other intestinal health problems and may even lead to death.

The commonest nutritional method used to avoid the effects of noxious microbes on the health of single-stomach animals is to add various antibiotic and chemotherapeutic substances inhibiting microbial growth to the fodder used to feed the animal. To maintain intestinal balance and to avoid the use of antibiotics, it is also possible to use fodders containing added probiotic products, such as various microbes, acids and yeasts.

Another method used to prevent intestinal diseases is to inhibit the adherence of noxious microbes on the wall of the intestine. A method used to achieve this is to add to the fodder mixtures various oligosaccharides, which adhere to the receptors on the intestinal wall or to microbial receptors, thus preventing noxious microbes from settling on the intestinal wall. Moreover, it has been established that certain oligosaccharides, e.g. fructo-oligosaccharides promote the growth of bifidomicrobes beneficial to animals.

A problem with the use of antibiotics is that it promotes the development of microbial strains immune to antibiotics and thus leads to health risks to humans. A problem with probiotic products is that they have a variable and generally low efficacy and are quite expensive to use. Likewise, a problem with fodders containing pure oligosaccharides is that they have a variable and generally low efficacy in preventing intestinal diseases. In addition, the price of pure oligosaccharides is high.

SUMMARY OF THE INVENTION

The object of the present invention is to eliminate the problems described above.

A specific object of the present invention is to disclose a procedure for preparing a food additive having a more efficient effect on intestinal microbes that promotes the health and/or growth of animals.

A further object of the invention is to disclose a food additive that makes it possible to reduce more effectively intestinal diseases in animals.

A further object of the invention is to disclose the use of a new additive prepared according to the present invention and a preparation containing such an additive.

As for the features characteristic of the invention, reference is made to the claims.

In the procedure of the invention for preparing a food additive, a filtered brewing yeast raw material containing oligosaccharides and/or polysaccharides is treated so that its cell structure is changed and the amount of free oligosaccharides and/or polysaccharides and/or the amount of oligosaccharides and/or polysaccharides on the surface of the cell structures are/is increased, i.e. e.g. the cell structure breaks up, to release the oligosaccharides and/or polysaccharides for use to prevent intestinal diseases. This treatment can also be used to release said components.

The invention also discloses products prepared by the method of the invention, their use and preparations containing additives according to the claims.

DETAILED DESCRIPTION

In a brewing yeast raw material containing oligosaccharides and/or polysaccharides, the oligosaccharides and/or polysaccharides are fixedly bound to the cell walls and other insoluble structures in the raw material. Investigations carried out in conjunction with the present invention revealed that adding such raw material directly to fodder does not produce any favourable effects of oligosaccharides; the animal (and human) digestive system is generally unable to decompose e.g. the cell wall of a yeast cell and release the desired oligosaccharides and/or polysaccharides. It was further established in the investigations that by treating the raw materials so that the amount of free oligosaccharides and/or polysaccharides and/or the amount of oligosaccharides and/or polysaccharides on the surface of the cell structures are/is increased, e.g. the cell structure of the raw material breaks up, a product is obtained that, when given to an animal together with fodder, substantially reduces intestinal diseases in the animal.

The mechanism of action of the product obtained in preventing intestinal diseases has not been fully elucidated in the investigations carried out, so it is based on various assumptions. According to one model, using the products obtained by the present method in conjunction with fodders inhibits microbial adherence to the intestine, in other words, the oligosaccharides and/or polysaccharides and/or other substances released in conjunction with the break-up of the cell structure of the raw material are assumed to act as analogues to the receptors of noxious microbes, such as $E.coli$, in the intestine and to inhibit the ability of the microbes to attach to the wall of the intestine.

According to another model, the products obtained via break-up of the raw material cell structure affect the growth of noxious microbes in both the small and the large intestines, in other words, beneficial intestinal microbes, such as lactic acid bacteria and bifidobacteria, are able to utilise the oligosaccharides and/or polysaccharides for their nutrition whereas noxious microbes, such as $E.coli$ and salmonella, are not. This favours the growth of beneficial microbes at the expense of noxious ones.

According to a third model, the decomposition products obtained via hydrolytic treatment of the raw material are assumed to have an effect on the immune reaction of the animal, i.e. certain raw material components, e.g. saccharine structures containing phosphor in yeast may improve the animal's immune reaction, thereby inhibiting intestinal diseases. Further the hydrolytic treatment of filtered yeast effects on the type and the strength of immune response.

Further, the components formed via hydrolytic treatment of the raw material may affect the adsorption of toxins; i.e. the components may bind and neutralise microbial toxins, thus inhibiting intestinal diseases. The assumed mechanisms of action described above may also work in combination, inhibiting intestinal diseases in animals.

Brewing yeast is produced as a side product of brewery industry. Normally, a brewing yeast mixture is transferred after the brewing to storage tanks in which the brewing yeast becomes precipitated on the tank base. After this, the beer remaining on the surface is separated. The dry matter of a brewing yeast produced in this way usually varies between 7–13% by weight.

In the method in accordance with the invention, the brewing yeast that became precipitated on the bottom of the tank is filtered mechanically and/or pneumatically. The brewing yeast may be filtered by any known filtering method. To prevent the filters, e.g. filtering discs, from getting blocked up, a vibrator such as a micro vibrator may be used at a high frequency and/or some other corresponding technique which prevents the filter from getting blocked up. The density of the filter is chosen based on the particle size.

The dry matter of a brewing yeast filtered in accordance with the invention is 15% by weight at the minimum, preferably 18–20% by weight.

In the filtered brewing yeast raw material used, the oligosaccharides and/or polysaccharides are bound to the cell structures of the raw material. Oligo- and polysaccharides can be released from the raw material by breaking up the cell structure of the raw material hydrolytically using an acid and/or an alkali, and/or enzymatically. Acids usable in the hydrolysis are e.g. ordinary mineral acids, such as hydrochloric acid, sulphuric acid, phosphoric acid, nitric acid, etc., as well as strong organic acids, such as formic acid, acetic acid, propionic acid, etc. The pH range used in acid hydrolysis may be below 4, e.g. about 2. In alkali hydrolysis, the alkalis used may be e.g. ordinary alkaline hydroxides such as sodium hydroxide, caustic potash etc., ammonium hydroxide or other alkalis releasing oligosaccharides and/or polysaccharides.

Among the enzymes usable in enzymatic hydrolysis are various cellulolytic and proteolytic enzymes, e.g. cellulases, acid or alkaline proteases, which may be selected according to the properties of the raw material to be used. In hydrolysis of yeast, e.g. Torula yeast, the culture solution of a derivative of *Trametes sanguinea* can be used. Furthermore, other added enzymes, proteases, ribonucleases and deaminases can be used in the hydrolysis. The enzyme treatment can also be implemented using a combination of several enzymes, simultaneously or in succession; e.g. protease treatment or protease treatment followed by ribonuclease treatment and deaminase treatment, in which process the protease breaks down the RNA, and when the amino acids are released, the ribonuclease breaks down the RNA into various nucleotides and the deaminase converts the adenosine mononucleotide into inosine mononucleotide. The protease treatment can be implemented using any known protease. Generally, the procedure can be implemented using enzymes mentioned in the specifications referred to below and/or other known enzymes having the desired effect of breaking up the cell structure, together and/or separately, e.g. as described in the specifications referred to below.

In a hydrolysis, the yeast can be heated to a temperature of over 40° C., in autolysis and enzymatic hydrolysis e.g. to 40–65° C. and in acid and alkalic hydrolysis e.g. 70–90° C.. The duration of the heating may vary depending on the temperature, e.g. between 1–12 hours.

Both the soluble and the insoluble fraction obtained via filtration and hydrolysis contain certain amounts of the desired oligosaccharides and/or polysaccharides. The soluble and insoluble fraction can be used e.g. in the production of a feed stuff or foodstuff; on the other hand, the soluble fraction or the insoluble fraction can be used.

Hydrolytic decomposition of yeasts is described in the following patent specifications and applications: U.S. Pat. Nos. 3,914,450, 3,443,969, 5,288,509, EP 299 078, JP 57-219695 and PCT/FI/96/00326. These and other prior-art methods can be used in conjunction with the present invention, the usable fraction being expressly the fraction containing oligosaccharides and/or polysaccharides or the non-fractionated product obtained as such. Thus, specification PCT/FI96/00326 describes the recovery of flavours, such as nucleotides, peptides and amino acids e.g. from brewing yeast and baking yeast, whereas in the present invention it is primarily the other components that are recovered, and, if desired, the flavours can be separated e.g. as described in the specification referred to. On the other hand, the separation of flavours can be omitted; in other words, part or all of the flavours can be included in the product prepared according to the invention.

Besides hydrolytic treatment of filtered brewing yeast, it is also possible to apply a treatment of the raw material with a detergent and/or a treatment that breaks up the cell structure of the raw material, e.g. by subjecting the cell structure to a mechanical, hydrostatic and/or pneumatic force, and/or to a heat treatment. Moreover, it is possible to use combinations of the above-mentioned methods, e.g. a treatment breaking up the cell and/or a heat treatment combined with an enzymatic or other hydrolytic treatment. If desired, the product obtained via hydrolytic treatment and/or via a treatment breaking up the cell and/or via heat treatment can be treated with a detergent to wash it.

If desired, the food additive produced according to the invention can be processed further, e.g. by fractionating or concentrating the saccharine structures obtained in the treatment. The further treatment, such as fractionation or concentration, can be implemented by any method known in itself. The fractionated and/or concentrated products obtained can be used as such for fodder or food, or they can be mixed with feed stuffs and/or foodstuffs known in themselves.

The product prepared by the method of the invention can be added to a fodder or foodstuff as such, moisturised or dried, and it can generally be treated as desired.

The food additive prepared by the method of the invention can be used in fodders for single-stomach animals, e.g. pigs, poultry, calves, fur animals such as foxes and minks, pets such as dogs and cats, horses, especially foals, fish and so on, to prevent intestinal diseases. The food additive can be used in fodders/foods for single-stomach animals in amounts of approx. 0.05–1.5 w-%, preferably about 0.1–1 w-% of the total amount of fodder, calculated in terms of dry matter and depending on the degree of hydrolysation; the percentages have been calculated based on a degree of hydrolysation of 50%; the percentages depend on the degree of hydrolysation. The additive can be used together with fodder/food or as such. The additive is preferably so used that the amount of additive used is 0.1–0.6 g/kg, calculated from the daily ration of foodstuff and/or feed stuff in terms of dry matter per kilogram of the animal's living weight.

The food additive of the invention can also be used in food for people, e.g. in food products for children or adults or as a preparation served separately to promote health, to balance intestinal microbes and to inhibit intestinal diseases.

The feed additive prepared by the method of the invention, when added to fodder intended for animals, effectively inhibits the growth of harmful micro-organisms and promotes the growth of beneficial microbes. At the same time, the growth of the animals, utilisation of fodder and the overall economy of production are improved. The feed additive according to the invention is approximately 30% more efficient in preventing the attachment and the growth of noxious microbes than a product prepared from an unfiltered brewing yeast. The invention improves the economy of the production of the feed additive and the preparation according to the invention. Further, the environmental emissions caused by the production are reduced because the animal is able to utilise the fodder more effectively. In addition, the use of the products of the invention, i.e. organic feed products, in the fodder for animals makes it possible to stop using antibiotics in fodder. The risk for the development of microbial strains immune to antibiotics is reduced and the health risks they cause for humans are also reduced.

In the following, the invention will be described in detail by the aid of embodiment examples.

EXAMPLE 1

In a laboratory test, food additive was prepared from baking yeast (PCT/FI96/00326). In the test, the effect of a processed yeast fraction on the adherence of *E.coli* bacteria to the mucous membranes in the intestine of a pig was tested using micro-titre plates; the test is described in the publication Conway, P. L., (1990) Infection and Immunity, 58, 3178–3182. Presence of K88-specific receptors in preine ileal mucus is age dependent.

It was established that the additive in a 1-% solution inhibits microbial adherence by 70–90%, depending on the coli strain. The results are shown in Table 1.

TABLE 1

| E. coli strains | Inhibition |
| --- | --- |
| strain 1 | 77% |
| strain 2 | 83% |
| strain 3 | 70% |
| strain 4 | 82% |
| strain 5 | 74% |
| strain 6 | 90% |
| strain 7 | 80% |

EXAMPLE 2

In a laboratory test, food additive was prepared from dried blood by treating it with a detergent enzyme.

It was established that the additive inhibits bacterial adherence by 90–95%, depending on the coli strain. The results are shown in Table 2.

TABLE 2

| E. coli strains | Inhibition |
| --- | --- |
| strain 1 | 93% |
| strain 2 | |
| strain 3 | 89% |
| strain 4 | 94% |
| strain 5 | |
| strain 6 | 96% |
| strain 7 | 90% |

EXAMPLE 3

In a laboratory test, food additive was prepared from sugar beet cuts by acid hydrolysis. Inhibition of bacterial adherence was determined as in Example 1. The results are shown in Table 3.

It was established that the additive inhibits bacterial adherence by 92–96% (Table 3).

TABLE 3

| E. coli strains | Inhibition |
| --- | --- |
| strain 1 | 92% |
| strain 2 | 96% |

EXAMPLE 4

Additive was prepared from larch by hydrostatic heat treatment. Inhibition of bacterial adherence was determined as above. The results are shown in Table 4.

It was established that the additive inhibits bacterial adherence by 96–98%.

TABLE 4

| E. coli strains | Inhibition |
| --- | --- |
| strain 1 | 96% |
| strain 2 | 98% |

EXAMPLE 5

In this test, four equal groups of pigs were fed with the following fodders:

Group 1: basic fodder (reference)
Group 2: basic fodder+40 ppm Avilamysine
Group 3: basic fodder+product prepared from yeast by hydrolytic treatment, in an amount of 0.5 w-% (of dry matter)
Group 4: basic fodder+product prepared from yeast by hydrolytic treatment, in an amount of 1.0 w-% (of dry matter).

The results are shown in Table 5.

TABLE 5

Effect of yeast addition on development of piglets

| Group | 1 | 2 | 3 | 4 |
| --- | --- | --- | --- | --- |
| Yeast % | 0 | 0 | 0.5 | 1.0 |
| Avilamysine | – | + | – | – |
| Piglets | 72 | 72 | 72 | 72 |
| Starting weight, kg | 9.5 | 10.6 | 10.7 | 9.0 |
| Final weight, kg | 23.0 | 24.1 | 24.2 | 22.4 |
| ADG, g/d | 456 | 502 | 512 | 433 |
| FCR kg fodder/kg Weight increase | 1.97 | 1.81 | 1.77 | 1.96 |

The analysed fodder composition did not differ from the calculated composition for any one of the groups. Both Avilamysine and the 0.5 w-% addition of yeast preparation increased the growth and fodder consumption effectively as compared with the reference group (group 1, Table 5). The yeast preparation and Avilamysine were substantially equal in effectiveness. The 1 w-% addition of yeast preparation had a slightly negative effect on the growth of the piglets; it clearly reduced the fodder consumption, which may have been the cause for the lower result. The test result indicates that the amount of the yeast product in fodder/foodstuff may preferably be under 1 w-%, e.g. up to 0.9 w-%.—The use of yeast, e.g. brewing yeast as protein raw material, in fodders is known in prior art. The amounts of yeast used are 2–10 w-% of the fodder, and yeast has been used to replace other protein raw materials, such as crushed soy, without any harmful effects on growth.

EXAMPLE 6

An amount of a product obtained from baking yeast by hydrolytic treatment, was added to the fodder of growing piglets. The fodder for the reference group contained Olaqvindox chemotherapeutic substance, 50 mg/kg. In the fodder for the yeast group, instead of Olaqvindox, yeast fraction was added in an amount of 0.5%. The results are shown in Table 6.

The yeast fraction addition clearly reduced diarrhoea in the piglets; the average diarrhoea index was 1.5 for the yeast group and 2.5 for the Olaqvindox group. In addition, 100% of the farrows in the Olaqvindox group had to be treated with an antibiotic or with zinc oxide because of diarrhoea. For the yeast group, the corresponding need was 12.5%.

TABLE 6

| Group | Olaqvindox 50 ppm | Yeast fraction 0.5% |
|---|---|---|
| Pigs | 79 | 87 |
| Initial weight, kg | 7.10 | 7.50 |
| Final weight, kg | 12.47 | 12.96 |
| Additional growth, g/day | 255 | 261 |
| Fodder efficiency kg/kg | 1.61 | 1.60 |
| Diarrhoea index | 2.5 | 1.5 |
| Treatments for diarrhoea, % of farrows | 100 | 12.5 |

Diarrhoea index graduation: 1 = normal faeces, 2 = loose faeces, 3 = watery diarrhoea

EXAMPLE 7

An amount of a product obtained from baking yeast by hydrolytic treatment, was added to the fodder of growing pigs. The measurement was implemented as in the preceding example. The results are shown in Table 7.

TABLE 7

| Group | Olaqvindox 50 ppm | Yeast fraction 0.5% |
|---|---|---|
| Number of pigs | 150 | 140 |
| Initial weight, kg | 21.7 | 21.3 |
| Test days, d | 33 | 33 |
| Additional growth, g/day | 777[a] | 847[a] |
| Fodder efficiency kg/kg | 2.07 | 1.87 |

EXAMPLE 8

An amount of a product obtained from baking yeast by hydrolytic treatment, was added to the fodder of growing piglets to investigate its effect on the growth and health of piglets and on fodder utilisation. Each test group comprised 6×4 piglets. The test groups were divided as shown in Table 8.

TABLE 8

| Additive | 0 | Olaqvindox 50 ppm | Avilamysine 40 ppm |
|---|---|---|---|
| Yeast fraction | + − | + − | + − |

In the fodder for the yeast groups, additive, i.e. yeast fraction, prepared from yeast by hydrolytic treatment was added in an amount of 0.5%. The results are shown in Table 9.

The addition of yeast fraction somewhat improved the growth of the piglets and the fodder utilisation (Table 9). The effect of yeast is particularly evident in the case of fodders without additives, in which the addition of the yeast fraction increased pig growth to the same level as for fodders with additives.

TABLE 9

Effect of yeast fraction on the growth of piglets and fodder utilisation

| Addition of yeast fraction | − | + | no additive − | no additive + |
|---|---|---|---|---|
| Number of piglets | 72 | 72 | 24 | 24 |
| Initial weight, kg | 13.42 | 13.62 | 13.50 | 13.50 |
| Final weight, kg | 23.73 | 24.80 | 22.38 | 24.55 |
| Additional growth, g/day | 493 | 535 | 429[a] | 526[b] |
| Fodder efficiency, kg of fodder/kg of additional growth | 1.94 | 1.73 | 2.16 | 1.78 | a,b ($p < 0.05$)

EXAMPLE 9

In this test, yeast fractions were prepared for microbiological tests. The raw materials used were baking yeast and brewing yeast, which were treated with an acid, enzymatically or autolysed with salt.

In the acid hydrolysis, the pH of the yeast suspensions was maintained at the value 4.0 by using a strong HCl solution (10 h), and the temperature was maintained at 60° C. The next day, the pH was lowered to the value 2.0 (11 h). Finally, the temperature was raised to 68° C. (12 h). The reaction mixture obtained was neutralised (pH 6.2) and centrifuged (4000 rpm, 20 min). From the soluble (supernatant) fraction and the cell residue, the dry matter content and adhesion were determined as in Example 1. Table 10 presents the dry matter content values.

In the enzymatic hydrolysis, the yeast suspensions were subjected to a heat treatment (95° C. for about 10 min.), whereupon they were transferred into a fermentor, pH 5.8, temperature 65° C. The proteolytic enzyme used was papain (Promod 144 L). In the final enzymatic treatment with ribonuclease, the nucleotides of RNA were split and deamizyme GMP was converted into IMP. The reaction mixtures were centrifuged (4000 rpm, 20 min). From the soluble fraction and the cell residue, the dry matter content and adhesion were determined as described above. The dry matter content values are presented in Table 10.

In the autolysis, the yeast was autolysed in a fermentor, temperature 50° C., with 0.5% NaCl added, mixing speed 100 rpm and reaction time 24 h. The reaction mixture was centrifuged (4000 rpm, 20 min). From the soluble fraction and the cell residue, the dry matter content and adhesion were determined as described above. The dry matter content values are presented in Table 10.

The brewing yeast used in this example was processed in the same way as the baking yeast (above) except that it was centrifuged (4000 rpm, 20 min.) before the processing to remove most of the soluble beer components from it. After this, hydrolyses and autolysis were carried out as described above.

TABLE 10

| Sample | Dry matter, w % |
|---|---|
| Brewing yeast | 12.0 |
| Baking yeast | 19.3 |
| Brewing yeast | 19.0 |

TABLE 10-continued

| Sample | Dry matter, w % |
|---|---|
| Baking yeast, Autol., supern. | 19.3 |
| Brewing yeast, Autol., supern. | 9.4 |
| Brewing yeast, Autol., total fraction | 20.9 |
| Baking yeast, Autol., total fraction | 18.1 |
| Brewing yeast, Autol., cells | 25.7 |
| Baking yeast, Autol., cells | 30.0 |
| Baking yeast, Acid hydr., total fraction | 17.8 |
| Brewing yeast, Acid hydr., total fraction | 18.7 |
| Baking yeast, Acid hydr., cells | 32.7 |
| Brewing yeast, Acid hydr., cells | 24.4 |
| Brewing yeast, Acid hydr., supern. | 19.1 |
| Baking yeast, Acid hydr., supern. | 10.9 |
| Baking yeast, Enz., cells | 20.3 |
| Brewing yeast, Enz., cells | 18.5 |
| Baking yeast, Enz., supern. | 14.4 |
| Brewing yeast, Enz., supern. | 10.6 |

When the dry matter content (supernatant) of the yeast extracts is considered, it can be seen that, in a comparison of different process types, the dry matter content of the enzymatically treated extract fractions is the highest dry matter content value. Thus, it can be assumed that the dry matter yield into yeast extract is highest and, conversely, that the dry matter yield in the cell fraction is lowest. In each hydrolysis, the extracts produced from baking yeast had a higher dry matter content than brewing yeast (the source material dry matter content, too, was by 0.5% higher for baking yeast than for brewing yeast). There was no significant difference between the autolysate and the acid-hydrolysed extract fraction. The dry matter content values for the cell fractions corresponding to yeast extract confirm the dry matter distribution of the enzymatically treated fractions to be in line with what could be concluded about the dry matter content of yeast extract, in other words, the dry matter content values of the cell residue were correspondingly all lowest in the enzymatic process.

When the dry matter distribution is calculated from the extract (supernatant), which does not fully reflect the situation as the cell residue still contains some soluble dry matter not extracted, about 46% of the dry matter in the dry matter distribution of the enzymatic process was in the yeast extract when baking yeast was being processed. The corresponding value for brewing yeast was about 28%. Accordingly, the extract yield will be about 50% of the total dry matter. The yield values for brewing yeast were clearly lower.

In acid hydrolysis the extract yield with baking yeast was about 44% of the dry matter and in autolysis about 34% of the dry matter. For brewing yeast, the corresponding figures were about 32% (acid) and about 38% (autolysis).

EXAMPLE 10

A laboratory test was carried out to establish the ability of processed baking yeast fractions to inhibit the adherence of *E.coli* K88 bacteria to the mucus in a pig's small intestine. The test procedure is described in Example 1. In this procedure, the wells in a micro-titre plate are covered with mucus isolated from a pig's intestine. Radioactively branded bacteria are added onto the mucus either as such or together with the substance under examination. The bacteria are incubated in the micro-titre wells and non-adhering bacteria are washed away. The adhering bacteria are loosened using a detergent and their number is calculated based on their radioactivity.

Yeast was hydrolysed with enzyme and hydrochloric acid. The enzyme used in the enzymatic hydrolysis was papain (Promod 144 L), pH 5.8., temperature 65° C. In the final enzymatic treatment with ribonuclease, the nucleotides of RNA were split and deamizyne GMP was converted into IMP. The reaction mixtures were centrifuged (1400 rpm, 20 min). About 48% of the dry matter was in the yeast extract.

In the acid hydrolysis, pH 2, temperature 68° C., the reaction mixture was centrifuged (4000 rpm, 20 min), total extract yield about 50% of total dry matter.

In this test, fresh baking yeast and processed and spray-dried baking yeast fractions were used as adherence inhibitors: soluble and solid fraction of enzymatically decomposed yeast, soluble and solid fraction of acid-hydrolysed yeast. The concentration of all yeast fractions and fresh yeast in the reaction mixture in the test was 0.16% (dry matter). For a bacterium added without yeast fraction, the adherence to the mucus is represented by the value 100%.

EXAMPLE 11

In the test, a food additive in accordance with the invention was prepared from a brewing yeast produced from beer industry the concentration of dry matter of which was 9 w-%.

The brewing yeast was mechanically filtered by a fine filter vibrating the filter discs by a micro vibrator at a high frequency. The yeast was filtered to a concentration of dry matter of 18 w-%. During the filtering, 3–4% of the dry matter was lost along with the liquid, and the yield of the dry matter of the yeast was 50 –60% of the estimated amount.

The filtered brewing yeast was hydrolyzed with an acid. In the hydrolyzing, the pH value of the yeast sludge was kept at a value of 2–3 with a strong acid (4 h) and at a temperature of 70–85° C. Then the pH value was increased to a value of 4–5 and the resulting product was cooled. The resulting end product may be used as such or it may dried with known methods.

EXAMPLE 12

In the test there was a comparison of the effect of a hydrolyzate as produced in example 11 and of the effect of a hydrolyzate produced using unfiltered brewing yeast on the attachment of *E. coli* bacteria on the mucous membrane of the intestine of a piglet by micro titer discs; the test has been described in the publication Conway, P. L., (1990) Infection and Immunity, 58, 1378–3182. Presence of K88-specific receptors in porcine ileal mucus is age dependent.

The results are shown in Table 11.

TABLE 11

| Concentration of the test matter in the analysis % | Control | The attachment of *E. coli* % | | |
|---|---|---|---|---|
| | | Hydrolyzate, unfiltered yeast | Hydrolyzate, filtered yeast | Filtered % from an unfiltered yeast |
| | 100 | | | |
| 0.16 | | 21.4 | 16.2 | 76 |
| 0.08 | | 45.6 | 32.4 | 71 |
| 0.016 | | 82.3 | 60.7 | 74 |

From the results it was obvious that the food additive in accordance with the invention was approximately 25–30% more efficient in preventing the attachment of *E.coli* than a product prepared from an unfiltered brewing yeast.

EXAMPLE 13

In the test, the effect of a yeast hydrolyzate as produced in example 1 and a yeast hydrolyzate 2 according to the invention was examined on the immunity of the intestine of rats. The immunity was determined by measuring the concentration of IgA in the gastrointestinal tract and by determining the proportional parts of the immune cells in the tissue samples of the intestine. The comparison definitions were made by a control and by betaglucan products.

In each test, 6 rats were used. The tissue samples from the duodenum and ileum were taken after 28 eight days of the beginning of the feeding test. They were diluted and the IgA was determined by using a new ELISA method, which is used to measure the immune response at intestine level. The previous methods have been used to measure the immunity indirectly by means of cellular cultures and blood samples. The methods now used may be used to measure both the cellmediated and the antibody-mediated immunity in the intestine and thereby directly measure the inhibiting effect of different products against the intestinal diseases. In the definitions, monoclonal antibodies specific to the immune cells of rats were used.

The product according to the invention (0,3 %) and betaglucan did not have a major effect on the concentration of IgA in the gastrointestinal tract. Both of them slightly increased the concentration of IgA as compared to the control. With smaller portions the product of the present invention increased the concentration of IgA as compared to the control.

The frequencies (+cells/0,5 cm villus) of the makrophages and CD8 positive cells are shown in Table 12.

TABLE 12

|  | Control | Betaglucan | Hydrolyzate, Ex. 1 | Hydrolyzate 2 |
|---|---|---|---|---|
| Macrophages | 8,2 | 5,8 | 15,7 | 13,0 |
| CD8+ | 8,5 | 13,0 | 19,5 | 15,0 |

Table 12 shows that the product in accordance with the invention significantly increased the frequency of the macrophage cells and clearly increased the frequency of the CD8 positive cells. The product in accordance with the invention stimulates in the gastrointestinal tract those types of immune response that have specific influence on the intracellular infection (viruses, parasites and intracellularly reproducing bacteria), thus also increasing the protection against infections caused by other than *E.coli*, whereas the betaglucan product was more or less ineffective.

The invention is not restricted to the examples of its embodiments described above, but different variations of it are possible within the framework of the inventive idea defined by the claims.

What we claim is:

1. A process for preparing a feed additive for use in the prevention of gastric disorders, intestinal diseases and the promotion of growth in animals, which comprises filtering a brewing yeast raw material and treating the filtered brewing yeast raw material hydrolytically to open the cell wall structure to increase the amount of free oligosaccharides and free polysaccharides and oligosaccharides and polysaccharides on the surface of the cell wall.

2. The process as defined in claim 1, wherein the brewing yeast is filtered mechanically.

3. The process as defined in claim 1, wherein the dry matter of the filtered brewing yeast is at least 15 wt %.

4. The process as defined in claim 1, wherein the dry matter of the filtered brewing yeast is 18–20 wt %.

5. The process as defined in claim 1, wherein the filtered raw material is treated with an acid and/or an alkali.

6. The process as defined in claim 1, wherein the filtered raw material is treated enzymatically.

7. The process as defined in claim 1, wherein the hydrolysis product obtained in the hydrolysis is non-fractionated.

8. The process as defined in claim 1, wherein the raw material is further treated mechanically, hydrostatically, pneumatically, thermally or combinations thereof, whereby the cell structure is broken up.

9. The process as defined in claim 1, wherein the product is treated with a detergent.

10. The process as defined in claim 1, wherein the oligosaccharide and/or polysaccharide product obtained is added to feed in an amount of about 0.05 to about 1.5 wt %, calculated in terms of dry matter.

11. The process as defined in claim 10, wherein the oligosaccharide and/or polysaccharide product obtained is added to feed in an amount of about 0.1 to about 1 wt %, calculated in terms of dry matter.

12. A feed additive for the prevention of intestinal diseases and promotion of growth, prepared in accordance with the process of claim 1.

13. The additive as defined in claim 12, wherein the raw material has been filtered mechanically.

14. The additive as defined in claim 12, wherein the additive has been prepared by treating the filtered raw material with an acid and/or an alkali.

15. The additive as defined in claim 12, wherein the additive has been prepared by treating the filtered raw material enzymatically.

16. The additive as defined in claim 12, for use in conjunction with feed for animals for the prevention of gastric disorders and intestinal diseases and for the promotion of growth.

17. The additive as defined in claim 16, wherein the amount of additive used is about 0.05 to about 1.5 wt % of the amount of the feed.

18. The additive as defined in claim 12 wherein the amount of the additive used is 0.05–1.5 wt % of the amount of feed.

19. A preparation containing a feed additive, designed for the prevention of intestinal diseases and for the promotion of growth and intended to be given to an animal to be fed, wherein the preparation contains an additive according to claim 12 in an amount of 0.01–0.6 g/kg, calculated from the daily ration of feed stuff as dry matter per kilogram of living weight.

20. The preparation as defined in claim 19, wherein the amount of additive contained in the preparation is about 0.05 to about 1.5 wt % of the daily ration of feed stuff.

* * * * *